(12) United States Patent
Ohsawa

(10) Patent No.: US 7,099,415 B2
(45) Date of Patent: Aug. 29, 2006

(54) RECEIVER

(75) Inventor: Susumu Ohsawa, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 753 days.

(21) Appl. No.: 10/067,981

(22) Filed: Feb. 8, 2002

(65) Prior Publication Data

US 2002/0118782 A1 Aug. 29, 2002

(30) Foreign Application Priority Data

Feb. 28, 2001 (JP) ............................. 2001-054674

(51) Int. Cl.
 *H04B 7/10* (2006.01)
(52) U.S. Cl. ...................... 375/347; 375/267; 455/135; 455/137; 455/277.2; 348/706
(58) Field of Classification Search ................ 375/347, 375/267, 260, 224, 316, 317; 455/273, 137, 455/45, 134, 277.1, 456, 277.2, 135, 276.1, 455/272, 132, 133, 140, 186.1, 275, 65, 506, 455/61, 101, 278.1, 303, 3.02, 12.1, 13.1, 455/3.01, 190.1, 13.2; 343/713; 342/450, 342/357.01; 381/13; 370/320; 714/724, 714/822
See application file for complete search history.

(56) References Cited

U.S. PATENT DOCUMENTS

| | | | | |
|---|---|---|---|---|
| 4,027,247 A | * | 5/1977 | Aranguren .................. 375/331 |
| 5,159,707 A | * | 10/1992 | Mogi et al. .................. 455/134 |
| 5,203,018 A | * | 4/1993 | Hirose .......................... 455/61 |
| 5,479,448 A | * | 12/1995 | Seshadri ...................... 375/267 |
| 5,592,471 A | * | 1/1997 | Briskman .................... 455/506 |
| 5,710,995 A | * | 1/1998 | Akaiwa et al. ........... 455/277.2 |
| 5,887,028 A | * | 3/1999 | Araki .......................... 375/224 |
| 6,064,865 A | * | 5/2000 | Kuo et al. .................. 455/135 |
| 6,070,064 A | * | 5/2000 | Inamori .................... 455/277.1 |
| 6,115,591 A | * | 9/2000 | Hwang ...................... 455/277.2 |
| 6,141,536 A | * | 10/2000 | Cvetkovic et al. ............. 455/45 |
| 6,169,888 B1 | * | 1/2001 | Lindenmeier et al. ... 455/277.2 |
| 6,226,507 B1 | * | 5/2001 | Ramesh et al. ........... 455/277.1 |
| 6,236,844 B1 | * | 5/2001 | Cvetkovic et al. .......... 455/273 |
| 6,449,469 B1 | * | 9/2002 | Miyahara ..................... 455/273 |
| 6,470,186 B1 | * | 10/2002 | Whikehart et al. ....... 455/456.1 |
| 6,577,353 B1 | * | 6/2003 | Welles et al. ................ 348/706 |
| 6,792,258 B1 | * | 9/2004 | Nokes et al. ............. 455/277.2 |
| 6,823,169 B1 | * | 11/2004 | Marko et al. ............... 455/3.02 |
| 6,873,834 B1 | * | 3/2005 | Edwards et al. .......... 455/277.1 |

* cited by examiner

*Primary Examiner*—Temesghen Ghebretinsae
(74) *Attorney, Agent, or Firm*—Drinker Biddle & Reath LLP

(57) ABSTRACT

A receiver which receives broadcast waves from a plurality of broadcasting systems is provided with signal amplifiers that amplify signals received from each of the broadcasting systems. The outputs of the signal amplifiers are superposed to produce a superposed signal. The superposed signal is then demodulated and reception information is reproduced. When the condition of the reception information has deteriorated, at least one of the signals from the signal amplifiers whose signal quality has deteriorated and the signals from the signal amplifiers whose noise level is high are excluded from the superposed signal.

4 Claims, 2 Drawing Sheets

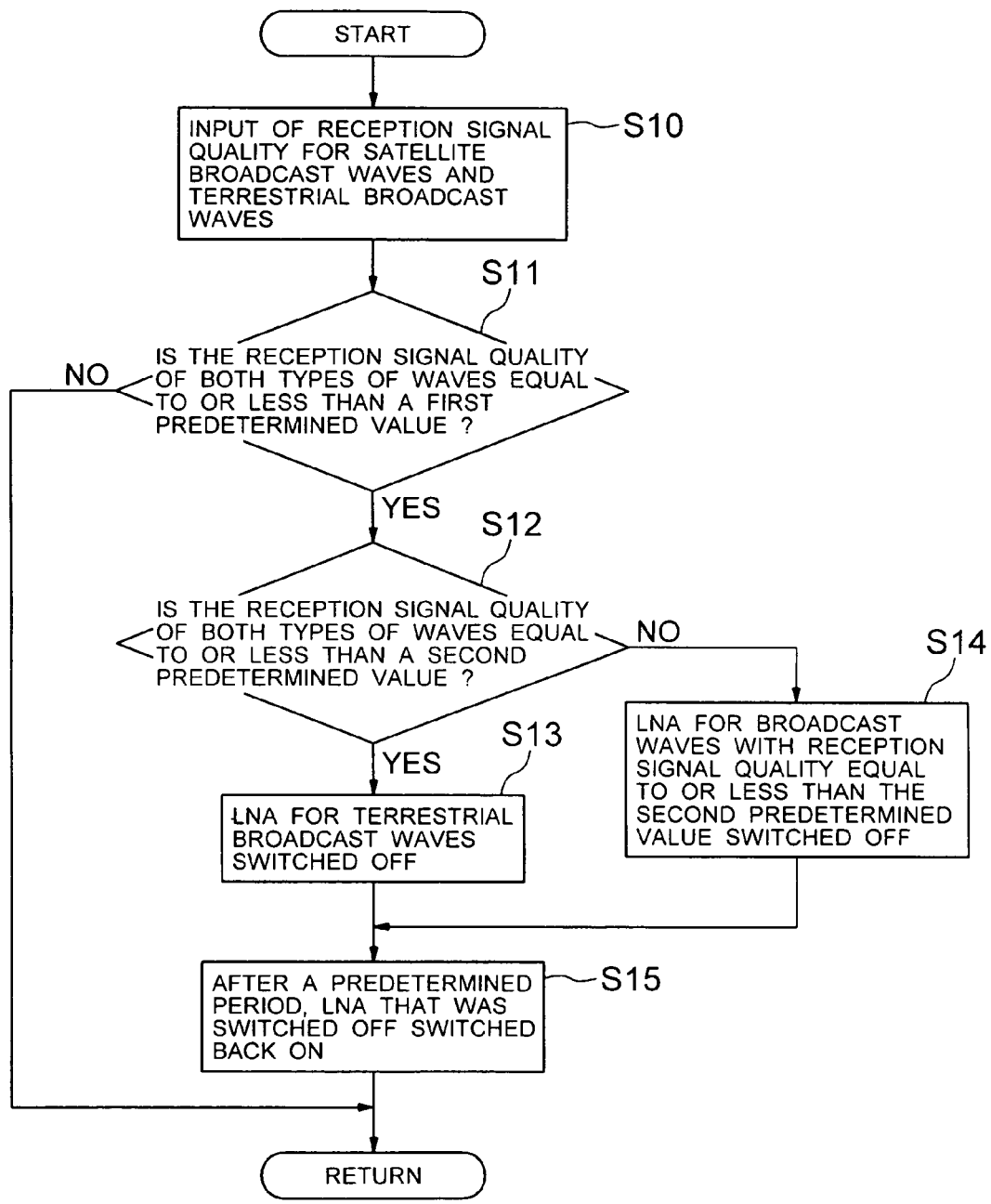

RECEIVER

BACKGROUND OF THE INVENTION

1. Field of the Invention

The present invention relates to a receiver equipped with a plurality of antennas.

2. Description of the Related Art

Movable receivers, such as receivers mounted in vehicles, operate in an environment where the movement of the receiver causes a constant change in the reception conditions for radio waves. For this reason, such receivers use a technique called diversity reception where a single broadcast wave or a set of broadcast waves is received using a plurality of antennas and adjustments are made to try and maintain favorable reception conditions.

To facilitate mounting in a vehicle, vehicle-mounted receivers include antenna units and a main reception unit, with high-frequency cables being used to connect the two types of units and transfer reception waves between them. Each antenna unit is composed of an antenna for receiving broadcast waves and a low noise amplifier (hereafter abbreviated to "LNA") that is positioned close to the antenna and amplifies the received broadcast waves. The main reception unit is composed of a demodulation/reproduction circuit that detects and demodulates the received broadcast waves and then reproduces the received information.

To perform diversity reception where a plurality of antennas are used, each antenna unit needs to be connected to the main reception unit with a separate high-frequency cable. This results in an increase in the number of high-frequency cables, which makes the receiver less practical. For this reason, conventional receivers are provided with a signal superposing circuit that gathers together the broadcast waves received by each antenna unit, with the signal superposing circuit and main reception unit being connected by a single high-frequency cable.

When the above construction is used, however, the broadcast waves received by all of the antenna units that can be used when performing diversity reception are superposed by the signal superposing circuit. As a result, noise that is produced in the LNA provided in each antenna unit and does not form part of the broadcast waves received by each antenna is also superposed by the signal superposing circuit. When the reception conditions are favorable, the reception signal has a sufficiently high level relative to this noise, so that there is little risk of the composite noise in the superimposed signal produced by the signal superposing circuit affecting the reproduction of the reception signal. However, when the reception conditions deteriorate, a high signal-to-noise ratio cannot be maintained for the reception signal, so that the composite noise can adversely affect the quality of the reception signal. In the worst-case scenario, the main reception unit can have difficulty in reproducing the reception signal.

OBJECT AND SUMMARY OF THE INVENTION

The present invention was conceived in view of the problems described above and has an object of providing a receiver that uses a diversity method where reception signals from a plurality of antennas are superposed, the receiver being able to reliably reproduce the reception information even when the reception conditions have deteriorated.

The present invention is a receiver, including: at least two antennas for receiving broadcast waves; signal amplifiers for amplifying the respective signals that have been received by each of the antennas; a signal superposing part for superposing each signal that has been amplified by the signal amplifiers to produce an output signal; a demodulating/reproducing part for demodulating the output signal of the signal superposing part and reproducing reception information included in the broadcast waves; and a control part performing control to reduce a number of signals in the output signal when reception conditions for the reception information have deteriorated.

BRIEF EXPLANATION OF THE DRAWINGS

FIG. 2 is a flowchart showing the procedure used to control low noise amplifiers (LNAs) in the embodiment shown in FIG. 1.

DETAILED DESCRIPTION OF THE PREFERRED EMBODIMENTS

Figure 1:
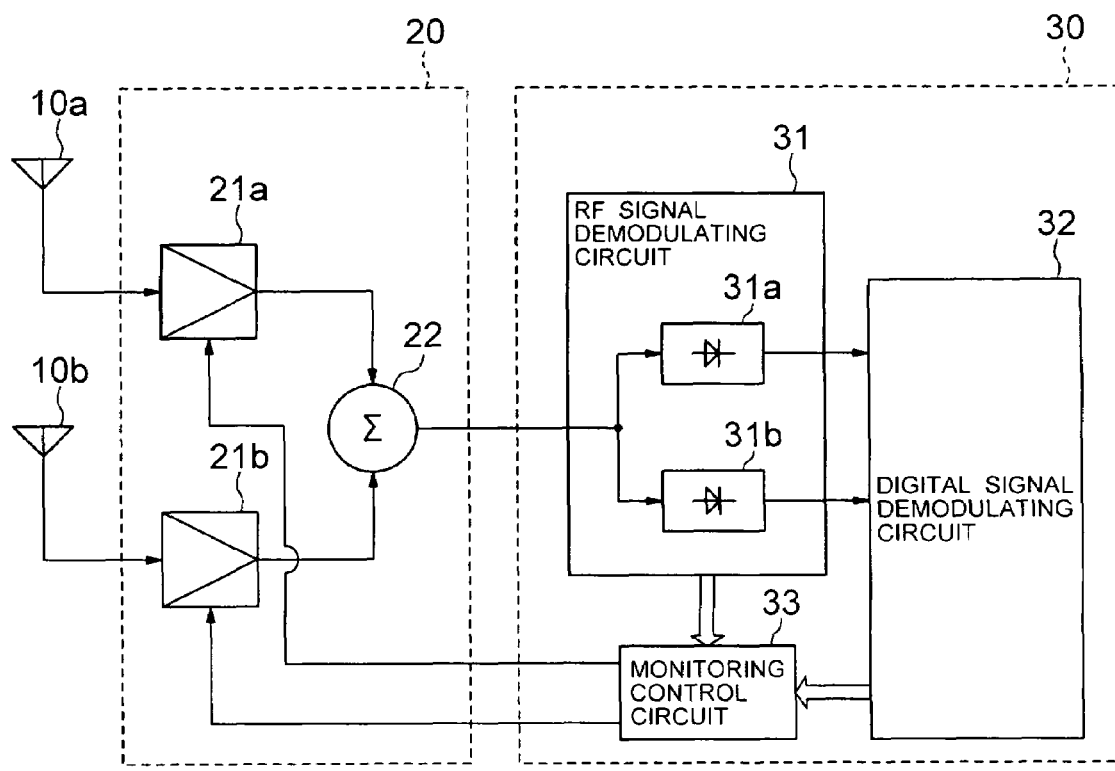
FIG. 1 is a block diagram showing the construction of a receiver according to a preferred embodiment of the present invention.

FIG. 1 is a block diagram showing the construction of a receiver according to a preferred embodiment of the present invention. The embodiment shown in FIG. 1 is a receiver that receives broadcast waves, i.e. signals. These broadcast waves are of a type in which programs with the same content are broadcast using both a satellite broadcasting system and a terrestrial broadcasting system.

In FIG. 1, the antennas 10a and 10b are reception antennas that receive waves broadcast by a broadcast station. In the embodiment shown in FIG. 1, the antenna 10a receives broadcast waves from the satellite broadcasting system, while the antenna 10b receives broadcast waves from the terrestrial broadcasting system.

An antenna unit 20 is composed of LNAs 21a and 21b and a signal superposing circuit 22 that superposes output signals received from the LNAs 21a and 21b. LNAs 21a and 21b are provided for the respective antennas.

It should be noted that the number of antennas and the number of LNAs included in the antenna unit 20 are not limited to the numbers in the embodiment illustrated in FIG. 1. Two or more antennas and LNAs may be provided, depending on the diversity reception technique that is used by the receiver.

A main reception unit 30 is mainly composed of a high-frequency signal demodulating circuit 31, a digital signal demodulating circuit 32, and a monitoring control circuit 33.

The high-frequency signal demodulating circuit 31 includes a satellite wave detecting/demodulating circuit 31a and a terrestrial wave detecting/demodulating circuit 31b. These circuits are each provided with detecting/demodulating functions, such as a frequency conversion function and an automatic gain adjustment function, for the corresponding kind of broadcasting waves.

The digital signal demodulating circuit 32 is a circuit that demodulates and reproduces digital data from reception signals that have been detected and demodulated by the high-frequency signal demodulating circuit 31. The monitoring control circuit 33 is a circuit that performs an ON/OFF control for the operation of the LNAs provided in the antenna unit 20 separately for each broadcasting system. It should be noted that the monitoring control circuit 33 is supplied by the high-frequency signal demodulating circuit 31 and the digital signal demodulating circuit 32 with various information showing the signal quality of the reception signal.

The following describes the operation of the embodiment illustrated in FIG. 1.

First, waves, i.e. signals that have been broadcast by a broadcast station via the two broadcasting systems are received by the antennas 10a and 10b. The antenna 10a is a circularly polarized wave reception antenna for receiving satellite broadcast waves, while the antenna 10b is a vertically polarized wave reception antenna for receiving terrestrial broadcast waves. The broadcast waves that have been received by each antenna are converted into electrical signals and are respectively supplied to the LNA 21a and the LNA 21b where the electrical signals are subjected to an amplification process.

The LNA 21a and the LNA 21b are each designed so as to have optimal characteristics for the antenna 10a for satellite broadcast waves or the antenna 10b for terrestrial broadcast waves corresponding to the LNA. For example, the LNA 21a used for satellite broadcast waves is provide by using an amplifier with a relatively low Noise figure compared to the LNA 21b used for terrestrial broadcast waves. This is because the reception waves for a satellite broadcast are weaker than the reception waves for a terrestrial broadcast. In order to stop distortion in the amplified output, an amplifier with a high intercept point is used as the LNA 21b used for terrestrial broadcast waves. This is because the field strength of the signals received by the terrestrial broadcast waves is likely to vary due to movement of a vehicle on which the equipment is mounted.

The LNAs used for each kind of broadcast waves can be switched ON and OFF independently using control signals transmitted by the monitoring control circuit 33 in the main reception unit 30.

The amplified signals outputted by the LNA 21a and the LNA 21b are superposed through summation by the signal superposing circuit 22, so as to gather the signals together for transmission over a single high frequency cable. Here, note that the broadcast waves received from the different broadcasting systems have different frequencies. As a result, even if two broadcast waves are superposed and transmitted via a single cable, the main reception unit 30 can still separate and distinguish between the two kinds of signals.

The signal superposing circuit 22 superposes the outputs received from each LNA by performing a simple summation of the signals. Consequently, the signal superposing circuit 22 can be constructed of only passive components such as inductors, capacitors, resistors, and the like. This means that the signals that have been received from each broadcasting system are not cross-modulated or otherwise distorted as they pass through the signal superposing circuit 22.

The reception signals for the broadcasting systems that have been superposed by the signal superposing circuit 22 are supplied from the antenna unit 20 to the high-frequency signal demodulating circuit 31 of the main reception unit 30 via the high-frequency cable. The superposed reception signals are then inputted in parallel to the satellite wave detecting/demodulating circuit 31a and the terrestrial wave detecting/demodulating circuit 31b inside the high-frequency signal demodulating circuit 31. Since the modulation technique and frequency differ for the satellite waves and terrestrial waves, each of the detecting/demodulating circuits 31a and 31b can identify the reception signal to be processed by that detecting/demodulating circuit, even if the inputs of the detecting/demodulating circuits 31a and 31b are connected in parallel.

The detecting/demodulating circuits 31a and 31b convert the frequency of the inputted reception signals, and adjust the amplitude using an automatic gain controller (not shown in the drawings). The signals whose amplitudes have been adjusted are then outputted to the digital signal demodulating circuit 32. In addition, amplitude information for the reception signals obtained from the automatic gain controller in the satellite wave detecting/demodulating circuit 31a and the terrestrial wave detecting/demodulating circuit 31b is supplied to the monitoring control circuit 33.

The digital signal demodulating circuit 32 demodulates and reproduces the signals detected from the signals received from the satellite and terrestrial broadcasting systems so as to reproduce the digital signals that have been sent as broadcast waves. At the same time, the digital signal demodulating circuit 32 measures the signal quality, such as the bit error rate, for the reception signals for each of the satellite and terrestrial broadcasting systems. Having done so, the digital signal demodulating circuit 32 supplies the monitoring control circuit 33 with signal quality information for each broadcasting system.

The monitoring control circuit 33 judges the reception signal quality for each broadcasting system, using the amplitude information for the reception signals for the satellite broadcasting system and the terrestrial broadcasting system, and the signal quality information for each system, which shows the bit error rate or the like.

It should be noted that the monitoring control circuit 33 is designed so as to know that more noise is produced by the LNA for terrestrial broadcast waves than the LNA for satellite broadcast waves. In other words, the monitoring control circuit 33 is aware of signal quality information for each antenna and the noise generated by each LNA. Based on this knowledge, the monitoring control circuit 33 performs a control function that switches the LNAs ON and OFF independently so as to optimize the reception conditions in the receiver.

The following describes the process used by the monitoring control circuit 33 to judge the reception conditions, and the control performed by the monitoring control circuit 33 to switch the LNAs ON and OFF based on this judgement. This description refers to the flowchart shown in FIG. 2. It is assumed that the processing subroutine shown in the flowchart of FIG. 2 is stored in a memory (not shown in the drawings) provided in the monitoring control circuit 33. A microprocessor (not shown) provided in the monitoring control circuit 33 is assumed to be synchronized with an internal clock and to repeatedly execute the subroutine with appropriate timing.

In step 10 of the subroutine in FIG. 2, the monitoring control circuit 33 receives an input of information relating to the reception signal quality for both the satellite broadcast waves and the terrestrial broadcast waves from the high-frequency signal demodulating circuit 31 and the digital signal demodulating circuit 32.

The reception signal quality shows the reception conditions for signals, and can be composed of information such as field strength and amplitude information for a reception signal, a C/N ratio, and a bit error rate for the received digital data that has been demodulated and reproduced. Of the information showing reception signal quality, information related to the analog aspect of the reception signal, such as reception field strength and C/N ratio, is mainly supplied by the high-frequency signal demodulating circuit 31. Information related to the digital aspect of the reception signal, such as a bit error rate, is mainly supplied by the digital signal demodulating circuit 32.

On receiving of this information, the monitoring control circuit 33 judges whether the reception signal quality for both the satellite and terrestrial broadcast waves is above a first predetermined value (step 11). Here, the first predetermined value for the reception signal quality represents a value for the reception signal quality that can ensure that the reception information demodulated from the received waves can be reproduced favorably without being affected by noise generated by the LNAs.

When the reception signal quality for one or both of the broadcasting systems is above the first predetermined value, the monitoring control circuit 33 terminates the processing in the subroutine of FIG. 2. This is because in this case, the LNAs can be maintained in their present operating states without the reception signal quality being affected.

On the other hand, when the reception signal quality for both of the broadcasting systems is equal to or less than the first predetermined value, the monitoring control circuit 33 proceeds to step 12. In step 12, the monitoring control circuit 33 judges whether the reception signal quality for both broadcasting systems is above a second predetermined value. Here, the second predetermined value for the reception signal quality represents a value for the minimum reception signal quality at which the reception information demodulated from the received waves can be reproduced favorably. Accordingly, when the reception signal quality is equal to or less than the second predetermined value, the amount of noise generated by an LNA, while at an extremely low level, can no longer be ignored.

When, in step 12, when the reception signal quality for both of the broadcasting systems is equal to or less than the second predetermined value, the monitoring control circuit 33 proceeds to step 13. Instep 13, the monitoring control circuit 33 selects only the reception signal for the satellite broadcasting system, and outputs a control signal to the antenna unit 20 to have the LNA 21b for the terrestrial broadcasting system switched OFF.

As described above, the signal superposing circuit 22 is a simple circuit composed of only passive components. Consequently, noise that is generated by the LNAs and does not form part of the reception signals is also superposed by the signal superposing circuit 22. This means that the larger the number of LNAs operating within the antenna unit 20, the greater the amount of noise added in the superposed signal.

Deterioration in the signal quality of the reception signal is normally due to a decrease in the signal level of the reception signal. On the other hand, by reducing the number of signals from LNAs that are superposed by the signal superposing circuit 22, noise generated by LNAs can be removed from the output signal of the signal superposing circuit 22. This means that by reducing the number of operating LNAs, an improvement can be made in the Noise figure of the antenna unit 20.

It should be noted that the LNA for the terrestrial broadcasting system is switched OFF in step 13, since the LNA used for satellite broadcast waves has a lower Noise figure than the LNA used for terrestrial broadcast waves. In other words, the Noise figure can be more effectively improved by switching OFF the LNA for terrestrial broadcast waves than by switching OFF the LNA for satellite broadcast waves.

As another reason, compared to the OFDM (Orthogonal Frequency Division Multiplexing) method used for terrestrial broadcasts, the QSPK (Quadrature Phase Shift Keying) technique that is usually used as the modulation method for satellite broadcasts enables the same signal quality to be obtained with a lower C/N ratio. As a result, when the signal reception levels for both broadcasting systems have fallen drastically, selecting the satellite broadcasting system is effective in obtaining the best possible reception signal quality.

On the other hand, when in step 12, the reception signal quality for one of the broadcasting systems is equal to or greater than the second predetermined value, the monitoring control circuit 33 proceeds to step 14. In step 14, the monitoring control circuit 33 selects only the broadcasting system with the favorable reception signal quality, and outputs a control signal to the antenna unit 20 to have the LNA for the broadcast waves with the reception signal quality that is equal to or less than the second predetermined value switched OFF.

As a result of the above operation, the signal received from the broadcasting system for which the reception signal quality is favorable is selected. Also, the operation of the LNA for the broadcast waves with poor reception signal quality is stopped, so that the noise generated by that LNA is removed from the output signal of the signal superposing circuit 22.

In short, in steps 13 and 14 the monitoring control circuit 33 executes processing that can easily maintain a favorable reception state even when the reception conditions have deteriorated. Putting this another way, the monitoring control circuit 33 prevents the noise generated from an LNA that is not being used in the reproduction of the reception information from being superposed by the signal superposing circuit 22. To do so, the number of reception signals (the number of LNA outputs) that are superposed by the signal superposing circuit 22 is reduced.

After executing the processing in steps 13 and 14, in step 15 the monitoring control circuit 33 activates a timer that measures a predetermined period. When the predetermined period measured by the timer has passed, the monitoring control circuit 33 outputs a control signal to switch ON the LNA whose operation was stopped in step 13 or 14, thereby completing the processing in the present subroutine.

In a vehicle-mounted receiver, the reception conditions for broadcast waves can change dramatically due to the movement of the vehicle. As a result, even if the reception conditions for a broadcasting system have deteriorated, there is a high probability that once a certain period has passed, the reception conditions will return to a favorable state by the movement of the vehicle.

It should be noted that the control procedure performed for LNAs in the present embodiment is not restricted to the flowchart shown in FIG. 2. As examples, an appropriate weighting may be applied to the content of the reception signal quality information obtained from the high-frequency signal demodulating circuit 31 or the digital signal demodulating circuit 32 shown in the block diagram in FIG. 1. In other words, greater importance can be attached to certain items of information used to express the reception signal quality when judging the reception signal quality.

The present embodiment is an example where programs with the same content are broadcast using two different broadcasting systems, a satellite broadcasting system and a terrestrial broadcasting system. However, the present invention is not restricted to the forgoing embodiment.

As one example, a receiver may receive broadcasts with different contents from a plurality of broadcasting systems. In this case, when the reception conditions deteriorate for the broadcasting system from which signals are presently being received, the receiver may remove signals, other than the signal presently being received, from being superposed. By doing so, the effects of the noise in the output signal of the signal superposing circuit 22 can be decreased, resulting in an improvement in the reception conditions for the broadcasting system from which signals are presently being received.

Also, the present invention may be embodied in a receiver that receives the same content from a single broadcasting system via a plurality of antennas. In this case, when the reception conditions deteriorate, a signal from an antenna that has a low reception signal quality or a signal outputted from an LNA with a high noise level may be excluded from the signals that are superposed. By doing so, the effects of the noise in the output signal of the signal superposing circuit can be decreased, resulting in an improvement in the reception conditions.

The control procedure for LNAs in the present embodiment is not restricted to switching LNAs ON and OFF. As one example, it is possible to use a construction that switches ON and OFF an output of each LNA to the signal superposing circuit.

It should be noted that when a signal from only one broadcasting system is being inputted to the signal superposing circuit 22, the signal superposing circuit 22 may still perform the superposing as described above. Alternatively the signal from the operational LNA may be directly supplied to the high-frequency signal demodulating circuit 31.

Embodiments of the present invention are also not restricted to the construction shown by the block diagram in FIG. 1. As one example, a receiver that receives broadcast waves using three or more antennas may be used. In this case, processing is performed in accordance with the nature of the deterioration in the reception conditions. For example, it is possible to use a construction where signals may be excluded from the signals that are superposed by the signal superposing circuit 22, starting with the signals from antennas that have a low reception signal quality or signals outputted from LNAs with high noise levels. Alternatively, it is also possible to use a construction where the reception signals for all antennas except for antennas for which signals are being demodulated and reproduced are excluded from the signals that are superposed.

As described above, when the reception conditions have deteriorated, the present invention selectively excludes amplifiers whose noise level is high and reception signals whose reception quality is poor. By doing so, increases in the Noise figure at the front end of a receiver can be suppressed, resulting in an improvement in the reception conditions.

It is understood that the foregoing description and accompanying drawings set forth the preferred embodiments of the invention at the present time. Various modifications, additions, and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No.2001-54674 which is hereby incorporated by reference.

What is claimed is:

1. A receiver, comprising:
   first and second antennas for receiving first and second broadcast wave signals respectively carrying thereon first and second information sinnals;
   first and second signal amplifiers for respectively amplifying the broadcast wave signals that have been respectively received by said first and second antennas, said second signal amplifier having a lower noise figure than said first signal amplifier;
   a signal superposing part for superposing the amplified signals that have been amplified by said signal amplifiers to produce an output signal;
   a demodulating/reproducing part for demodulating the output signal from said signal superposing part and for reproducing the first and second information signals included in said output signal; and
   a control part for detecting deterioration in qualities of the respective ones of the reproduced first and second information signals and for performing a final control operation to disable said first amplifier when it is determined that both of said first and second information signals are deteriorated in their qualities.

2. A receiver according to claim 1, in which said control part performs a preliminary control operation to disable either one of said first and second amplifiers when it is determined that either one of said first and second information signals is deteriorated in its quality.

3. A receiver according to claim 1, in which said control part finishes its control operation upon the lapse of a predetermined time period from the initiation of the final control operation.

4. A receiver according to claim 2, in which said control part finishes its further control operation upon the lapse of a predetermined time period from the initiation of the preliminary control operation.

* * * * *